US009968891B2

(12) United States Patent
Uchikawa et al.

(10) Patent No.: US 9,968,891 B2
(45) Date of Patent: May 15, 2018

(54) CERAMIC SEPARATION MEMBRANE STRUCTURE AND METHOD FOR PRODUCING SAME

(71) Applicant: NGK Insulators, Ltd., Nagoya (JP)

(72) Inventors: Tetsuya Uchikawa, Nagoya (JP); Kenji Yajima, Nagoya (JP); Naoko Inukai, Nagoya (JP); Makiko Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 99 days.

(21) Appl. No.: 14/867,110

(22) Filed: Sep. 28, 2015

(65) Prior Publication Data
US 2016/0016125 A1 Jan. 21, 2016

Related U.S. Application Data

(63) Continuation of application No. PCT/JP2014/056125, filed on Mar. 10, 2014.

(30) Foreign Application Priority Data

Mar. 28, 2013 (JP) ................................. 2013-070731

(51) Int. Cl.
B01D 71/00 (2006.01)
B01D 71/02 (2006.01)
(Continued)

(52) U.S. Cl.
CPC ......... *B01D 71/028* (2013.01); *B01D 53/228* (2013.01); *B01D 61/145* (2013.01);
(Continued)

(58) Field of Classification Search
CPC .... B01D 71/028; B01D 71/027; B01D 71/70; B01D 71/02; B01D 53/228; B01D 61/145;
(Continued)

(56) References Cited

U.S. PATENT DOCUMENTS 5,968,366 A * 10/1999 Deckman ........... B01D 67/0088
210/490
6,383,563 B1 * 5/2002 Bratton .............. B01D 67/0051
427/244
(Continued)

FOREIGN PATENT DOCUMENTS

JP 2002-263457 A1 9/2002
JP 2003-290636 A1 10/2003
(Continued)

OTHER PUBLICATIONS

Fardad, 2000, Journal of Materials Science, 35, 1835-1841.*
(Continued)

*Primary Examiner* — Allison G Fitzsimmons
(74) *Attorney, Agent, or Firm* — Burr & Brown, PLLC

(57) ABSTRACT

Provided are a ceramic separation membrane structure improved in separation performance with no reduction in permeability, and a method for producing the structure. The ceramic separation membrane structure includes a ceramic porous body, a zeolite separation membrane disposed on the ceramic porous body, and a repair portion made of a repairing material of organic-inorganic hybrid silica. The organic-inorganic hybrid silica is a combination of an organic component and a silicon-containing inorganic component.

7 Claims, 5 Drawing Sheets

(51) Int. Cl.
- *B01D 63/06* (2006.01)
- *B01D 65/10* (2006.01)
- *B01D 67/00* (2006.01)
- *B01D 53/22* (2006.01)
- *B01D 61/14* (2006.01)
- *B01D 69/10* (2006.01)
- *B01D 71/70* (2006.01)

(52) U.S. Cl.
CPC ......... *B01D 63/066* (2013.01); *B01D 65/108* (2013.01); *B01D 67/0051* (2013.01); *B01D 67/0083* (2013.01); *B01D 67/0088* (2013.01); *B01D 69/10* (2013.01); *B01D 71/027* (2013.01); *B01D 71/70* (2013.01); *B01D 2053/221* (2013.01); *B01D 2323/06* (2013.01); *B01D 2323/08* (2013.01)

(58) Field of Classification Search
CPC .. B01D 63/066; B01D 63/061; B01D 65/108; B01D 67/0051; B01D 67/0083; B01D 67/0088; B01D 67/0039; B01D 67/0046; B01D 67/0048; B01D 67/0081; B01D 46/0001
USPC ................................... 210/488, 510.1, 502.1
See application file for complete search history.

(56) References Cited

U.S. PATENT DOCUMENTS

| | | | |
|---|---|---|---|
| 6,536,604 B1 * | 3/2003 | Brinker | B01D 53/22 210/490 |
| 2008/0093008 A1 | 4/2008 | Isomura et al. | |
| 2009/0246114 A1 | 10/2009 | Sah et al. | |
| 2010/0144512 A1 | 6/2010 | Uchikawa et al. | |
| 2010/0300960 A1 | 12/2010 | Hishiki et al. | |
| 2012/0272826 A1 | 11/2012 | Uchikawa et al. | |

FOREIGN PATENT DOCUMENTS

| | | |
|---|---|---|
| JP | 2004-214089 A1 | 7/2004 |
| JP | 2009-523592 A1 | 6/2009 |
| JP | 2009-233540 A1 | 10/2009 |
| JP | 2010-506700 A1 | 3/2010 |
| JP | 2010-115610 A1 | 5/2010 |
| JP | 2013-034994 A1 | 2/2013 |
| WO | 2007/081212 A1 | 7/2007 |
| WO | 2008/050818 A1 | 5/2008 |
| WO | 2009/119292 A1 | 10/2009 |

OTHER PUBLICATIONS

Kanezashi, 2008, AIChE Journal, vol. 54, Issue 6, June, pp. 1478-1486.*

Yushan Yan, et al., "*Preparation of Highly Selective Zeolite ZSM-5 Membranes by a Post Synthetic Coking Instrument*," Journal of Membrane Science, 1997, vol. 123, pp. 95-103.

Mikihiro Nomura, at al., "*Silicate Membranes Modified by Counerdiffusion CVD Technique*," Ind, Eng. Chem. Res.,1997, vol. 36, pp. 4217-4223.

Baoquan Zhang, et al., "*Selective Defect-Patching* of Zeolite Membrane using Chemical Liquid Deposition at Organic/Aqueous Interfaces," Advanced Functional Materials, 2008, vol. 18, pp. 3434-3443.

International Search Report and Written Opinion (Application No. PCT/JP2014/056125) dated May 13, 2014.

European Search Report (Application No. 14774431.2) dated Nov. 3, 2016.

European Office Action (Application No. 14774431.2) dated Oct. 2, 2017.

* cited by examiner

CERAMIC SEPARATION MEMBRANE STRUCTURE AND METHOD FOR PRODUCING SAME

BACKGROUND OF THE INVENTION

1. Field of the Invention

The present invention relates to a ceramic separation membrane structure having a zeolite separation membrane on a ceramic porous body and to a method for producing such a ceramic separation membrane structure.

2. Description of Related Art

These days, ceramic filters are used to selectively collect only a specific component from a multicomponent mixture (fluid mixture). Ceramic filters have a higher level of mechanical strength, durability, corrosion resistance, and other properties than organic polymer filters. Therefore, ceramic filters are advantageously used to remove suspended matter, bacteria, dust, and the like from liquids or gases in a variety of fields such as water treatment, exhaust gas treatment, pharmaceuticals, and foods.

Such filters known in the art include filters having a zeolite membrane formed on a ceramic porous body. When a zeolite membrane is formed on a ceramic porous body by hydrothermal synthesis, some of the cells have a defect, which influences the quality of the product, although a good zeolite membrane is formed in many of the cells. If the hydrothermal synthesis is repeated to repair the defect, the non-defective portion will increase in thickness, so that the amount of permeation will decrease.

Patent Document 1 and Non Patent Documents 1 to 3 are known to be relevant to the repair of membranes.

CITATION LIST

Patent Documents

[Patent Document 1] JP-A-2004-214089

Non Patent Documents

[Non Patent Document 1] Y. S. Yan, M. E. Davis, G. R. Gravalas, J. Membr. Sci. 1997, 123, 95.
[Non Patent Document 2] M. Nomura, T. Yamaguchi, S. Nakao, Ind. Eng. Chem. Res. 1997, 36, 4217
[Non Patent Document 3] B. Zhang, C. Wang, L. Lang, R. Cui, X. Liu, Adv. Funct. Mater. 2008, 18, 3434-3443

SUMMARY OF THE INVENTION

Problem to be Solved by the Invention

Patent Document 1 and Non Patent Documents 2 and 3 disclose the use of silica as a material for repairing membrane defects. Since silica is not resistant to hot water or alkali, membranes repaired with silica have limited applications. Therefore, membranes repaired with silica have a problem in that they cannot be used for dehydration at high water concentration. As to repairing methods, Patent Document 1 and Non Patent Documents 2 and 3 disclose pressurized filling, CVD method, and CLD method, respectively. These methods also have a problem in that they require a large-scale apparatus and complicated operation.

In the method disclosed in Non Patent Document 1, the repairing material placed over the membrane surface hinders the permeation of the separated material so that the amount of permeation will significantly decrease. In this method, the temperature of the heat treatment after the coating is as high as 500° C. In this step, some membranes are more likely to suffer new defects such as cracks.

It is an object of the present invention to provide a ceramic separation membrane structure that has improved separation performance with no reduction in permeability, and to provide a method for producing such a ceramic separation membrane.

Means for Solving the Problem

The inventors have found that the use of organic-inorganic hybrid silica as a repairing material makes it possible to solve the problem. Accordingly, the present invention provides the ceramic separation membrane structure and the method for producing ceramic separation membrane structure shown below.

According to a first aspect of the present invention, a ceramic separation membrane structure including: a ceramic porous body; a zeolite separation membrane disposed on the ceramic porous body; and a repair portion made of a repairing material of organic-inorganic hybrid silica, is provided.

According to a second aspect of the present invention, a ceramic separation membrane structure according to the first aspect is provided, wherein the organic-inorganic hybrid silica is a product obtained by hydrolysis and dehydration condensation of a silane coupling agent or an alkoxysilane.

According to a third aspect of the present invention, the ceramic separation membrane structure according to the first or second aspects is provided, wherein the organic-inorganic hybrid silica is a product obtained by hydrolysis and condensation of a bistriethoxysilyl compound of the structural formula $(C_2H_5O)_3SiC_nH_{2n}Si(C_2H_5O)_3$, wherein $n \geq 1$.

According to a fourth aspect of the present invention, the ceramic separation membrane structure according to any one of the first to third aspects is provided, wherein the zeolite separation membrane includes DDR-type zeolite.

According to a fifth aspect of the present invention, the ceramic separation membrane structure according to any one of the first to fourth aspects is provided, wherein the ceramic porous body has a monolith shape.

According to a sixth aspect of the present invention, a method for producing the ceramic separation membrane structure according to any one of the first to fifth aspects is provided, the method including a repairing step to form the repair portion, wherein the repairing step includes depositing the repairing material by a flow-down method including allowing the repairing material to flow down along the surface of the zeolite separation membrane.

According to a seventh aspect of the present invention, the method for producing ceramic separation membrane structure according to the sixth aspect is provided, wherein the repairing step includes performing a heat treatment at a temperature lower than the zeolite separation membrane template firing temperature after the repairing material is deposited.

According to an eighth aspect of the present invention, the method for producing ceramic separation membrane structure according to the seventh aspect is provided, wherein the heat treatment is performed at a temperature of 350° C. or lower.

Effect of the Invention

The ceramic separation membrane structure of the present invention has improved separation performance with no reduction in permeability because it is repaired with organic-inorganic hybrid silica as a repairing material.

The method for producing ceramic separation membrane structure of the present invention can be performed simply by applying an organic-inorganic hybrid silica-containing sol to the membrane by a flow-down method, naturally drying the sol, and then heating the sol at 350° C. or lower in a reducing atmosphere. Therefore, the method for the present invention can be performed by a simple procedure with a simple apparatus.

DETAILED DESCRIPTION OF THE INVENTION

Hereinafter, embodiments of the present invention will be described with reference to the drawings. The embodiments described below are not intended to limit the present invention and may be changed, altered, or modified without departing from the scope of the present invention.

(1) Ceramic Separation Membrane Structure

Figure 1:
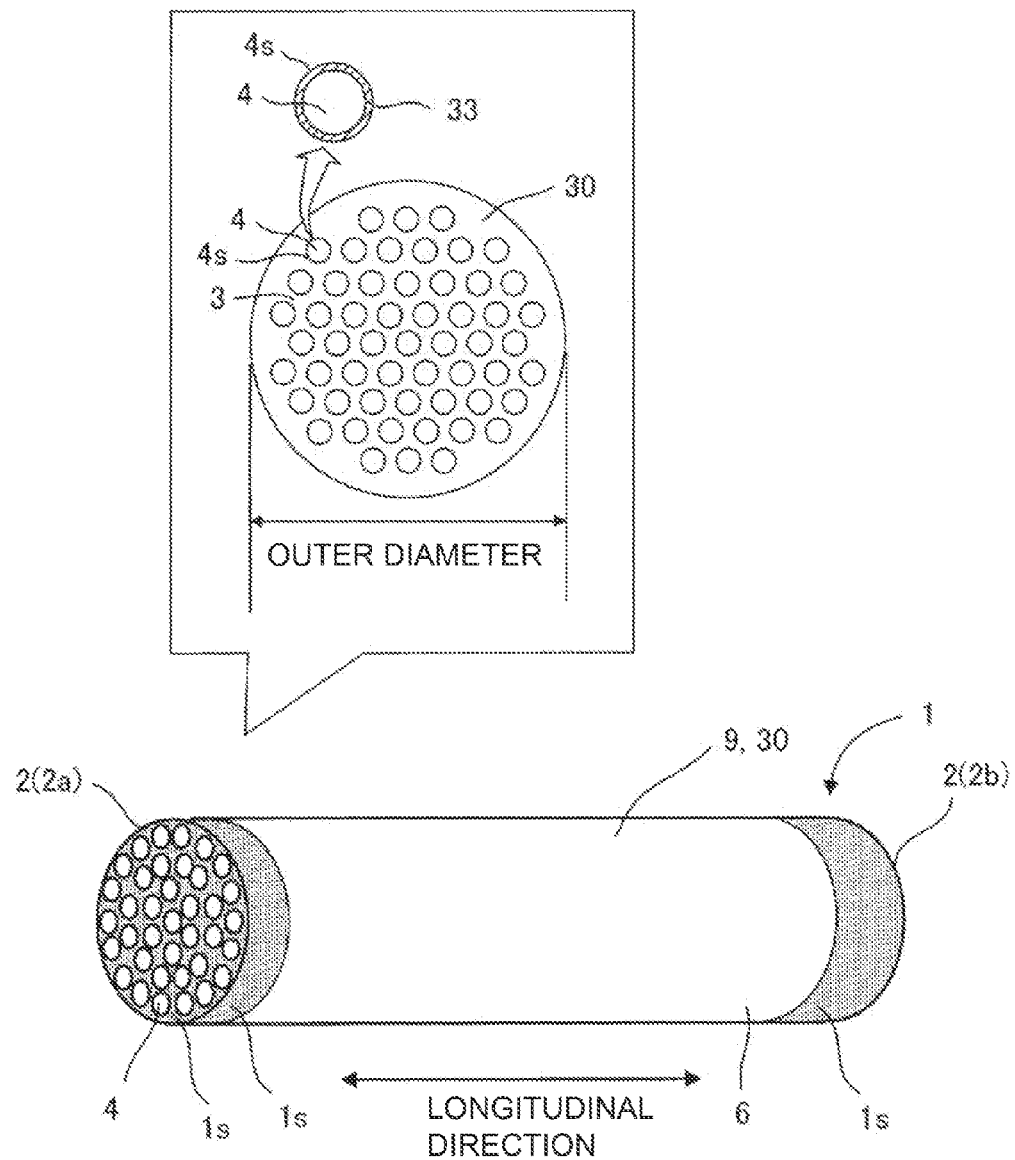
FIG. 1 is a diagram showing an embodiment of a monolith type separation membrane structure according to the present invention.
Figure 2A:
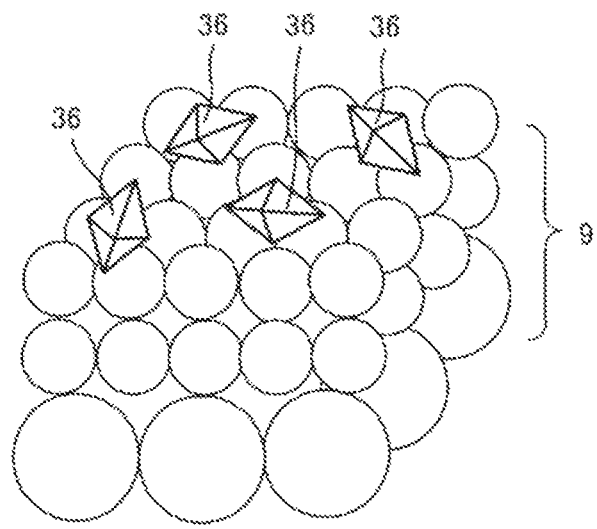
FIG. 2A is a schematic diagram showing the step of depositing seed crystals on a ceramic porous body.
Figure 2B:
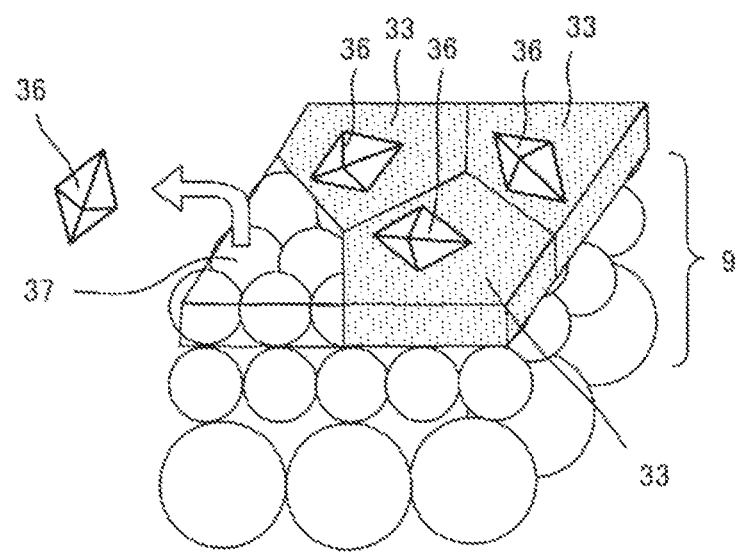
FIG. 2B is a schematic diagram showing the step of forming a zeolite separation membrane.
Figure 2C:
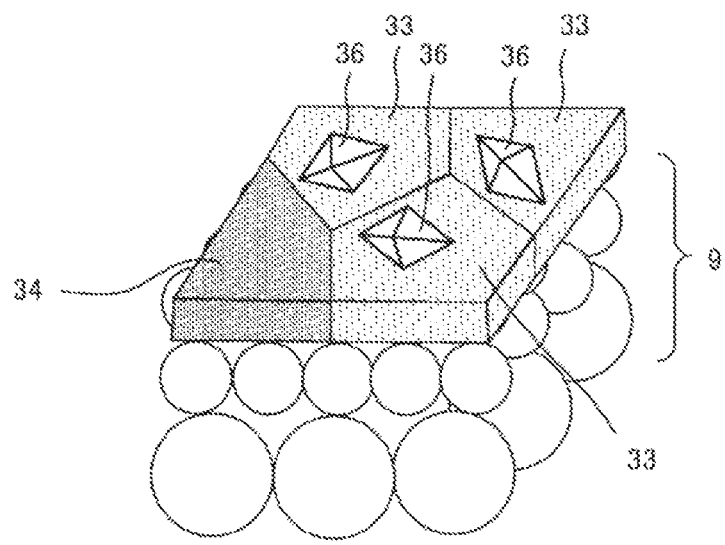
FIG. 2C is a schematic diagram showing the step of forming a repair portion.

FIG. 1 shows an embodiment of a ceramic separation membrane structure 1 according to the present invention. FIGS. 2A to 2C show the step of forming a zeolite separation membrane 33 and a repair portion 34 on a ceramic porous body 9. FIG. 2A shows the step of depositing seed crystals 36 on the ceramic porous body 9. FIG. 2B shows the step of forming the zeolite separation membrane 33. FIG. 2C shows the step of forming the repair portion 34.

The ceramic separation membrane structure 1 of the present invention (also simply referred to as the separation membrane structure) includes a ceramic porous body 9 (also simply referred to as a porous body), a zeolite separation membrane 33 (also simply referred to as a separation membrane) disposed on the ceramic porous body 9, and a repair portion 34 made of a repairing material of organic-inorganic hybrid silica. The organic-inorganic hybrid silica is a combination of an organic component and a silicon-containing inorganic component. The two components may be in a blended state or chemically bonded together (the presence or absence of bonding, the degree of bonding, or the mode of bonding does not matter), having a domain size of 1 μm or less.

In the ceramic separation membrane structure 1, the repair portion 34 made of a repairing material of organic-inorganic hybrid silica can improve the separation performance without reducing the permeability. The organic-inorganic hybrid silica, which has high resistance to hot water and alkali, is suitable for use in repairing membranes designed to be used for dehydration in an environment that can degrade silica and other materials and make them unusable.

As shown in FIG. 1, the porous body 9 has a partition wall 3 made of a porous material having a large number of pores. The partition wall 3 forms cells 4, which serve as fluid flow channels. The separation membrane 33 and the repair portion 34 are formed on the inner wall surface 4s of the cells 4.

In the description, the ceramic porous body 9 is also referred to as a substrate 30. When two or more layers with different average particle sizes are formed on the substrate 30, the resulting stack including the layers is also referred to as a porous body 9.

As shown in FIG. 2A, seed crystals 36 are deposited in the process of forming the separation membrane 33 on the inner wall surface 4s of the cells 4. As shown in FIG. 2B, when the separation membrane 33 is formed by hydrothermal synthesis, a seed crystal 36 fails to be deposited on the substrate 30 or drops off after the deposition, so that an uncovered defect occurs. In addition, a crack defect occurs in the membrane in the step of removing structure directing agent for zeolite by combustion. Thus, the repair portion 34 is formed after the formation of the separation membrane 33. As shown in FIG. 2C, therefore, the defect in the zeolite separation membrane 33, disposed on the ceramic porous body 9, is repaired by the repair portion 34.

Before the repairing, the zeolite separation membrane 33 contains the structure directing agent. The repair portion 34 may be formed before or after the removal of the structure directing agent. When the repairing is performed after the removal of the structure directing agent for zeolite, the crack defect generated in the step of removing the structure directing agent by combustion can also be repaired.

The mass ratio of the repair portion 34 to the zeolite separation membrane 33 is preferably 1% or less. As used herein, the term "mass ratio" refers to the mass ratio determined by quantitative X-ray diffraction analysis. A standard material is prepared by mixing zeolite powders for the zeolite separation membrane 33 and the repair portion 34 in a specific mass ratio (e.g., separation membrane:repair portion=9:1). The standard material is then subjected to X-ray diffraction analysis for the preparation of a calibration curve. Subsequently, the repaired zeolite separation membrane 33 is subjected to X-ray diffraction analysis, and the mass ratio of the repair portion 34 is determined by comparing the values of the resulting calibration curve with the values of the standard calibration curve. When the ratio of the repair portion 34 determined in this way is 1% or less, the zeolite separation membrane 33 can provide sufficient performance. Hereinafter, the substrate 30, the separation membrane 33, the repair portion 34, and other features will be described in detail.

(Substrate)

The substrate 30 is preferably made of porous ceramic. More preferably, the aggregate particles for the substrate 30 are made of alumina ($Al_2O_3$), titania ($TiO_2$), mullite ($Al_2O_3.SiO_2$), potsherds (Scherben), cordierite ($Mg_2Al_4Si_5O_{18}$), or the like. Among them, alumina is further preferred because the raw material (aggregate particles) is easily available with controlled particle sizes and it can form a stable kneaded material and has high corrosion resistance.

The substrate 30 has a round pillar outer shape with a circumference surface 6. The substrate 30 may have any overall shape or size as long as it does not interfere with the separation function. The overall shape may be, for example, round pillar, square pillar (tubular with a tetragonal cross-section perpendicular to the central axis (longitudinal direction)), trigonal pillar (tubular with a triangular cross-section perpendicular to the central axis), or the like. In particular, a round pillar shape is preferred because of easiness of extrusion, resistance to deformation caused by firing, and easiness of sealing together with a housing. When the membrane is for use in hyperfiltration or ultrafiltration, the substrate preferably has a round pillar shape with a cross-sectional diameter of 30 to 220 mm perpendicular to the central axis and with a length of 150 to 2,000 mm in the central axis direction. Specifically, in an embodiment, the substrate 30 is monolith type (in the shape of a monolith) as shown in FIG. 1. The term "monolith type" refers to a honeycomb shape or a shape having a plurality of cells extending from a first end face to a second end face in the longitudinal direction. Alternatively, the substrate 30 may have a hollow cylindrical shape.

In the embodiment shown in FIG. 1, the substrate 30 has a plurality of cells 4 that are formed from a first end face 2a (one end face) to a second end face 2b (the other end face) in the longitudinal direction and partitioned by the porous partition wall 3 to form fluid flow channels. The substrate 30 has 30 to 2,500 cells 4 passing through between both ends in the longitudinal direction and being parallel to the longitudinal direction.

In the substrate 30, the cross-sectional shape of the cells 4 (the shape of the cross-section perpendicular to the direction in which the cells 4 extend) may be, for example, circular, elliptic, polygonal, or other shapes. The polygonal shape may be tetragonal, pentagonal, hexagonal, triangular or the like. When the substrate 30 has a round pillar shape, the direction in which the cells 4 extend coincides with the direction of the central axis (longitudinal direction).

When the cells 4 of the substrate 30 have a circular cross-sectional shape, the cells 4 preferably have a diameter of 1 to 5 mm. The cells with a diameter of 1 mm or more can ensure a sufficient membrane area. When the diameter is 5 mm or less, the substrate can have a sufficient strength.

A plurality of layers with different average particle sizes may also be provided on the substrate 30. Specifically, intermediate and surface layers with smaller average particle sizes may be stacked on the substrate 30. When the intermediate and surface layers are provided, the resulting stack including them is called the porous body 9.

Both end faces 2 and 2 of the substrate 30 are preferably provided with seal portions 1s. The seal portions is provided in this way can prevent part of a mixture from flowing directly into the interior of the substrate 30 from the end face 2 of the substrate 30 without passing through the separation membrane 33, so that part of the mixture can be prevented from mixing with the gas or the like passing through the separation membrane 33 and prevented from exiting with the gas or the like from the circumference surface 6. The seal portion 1s may be, for example, a glass seal or a metal seal.

(Separation Membrane)

The separation membrane 33 has a plurality of pores with an average pore diameter smaller than that of the porous body 9 (the substrate 30 or the stack including the intermediate and surface layers). The separation membrane 33 is disposed on the surface of the inner wall of each cell 4 (inner wall surface 4s). Alternatively, the separation membrane 33 may be disposed on the circumference surface of a hollow cylindrical substrate 30.

The average pore diameter of the separation membrane 33 may be appropriately determined depending on the required filtration or separation performance (the particle size of substances to be removed). For example, a ceramic filter for use in hyperfiltration or ultrafiltration preferably has an average pore diameter of 0.01 to 1.0 μm. In this case, the average pore diameter of the separation membrane 33 is the value measured by the air flow method described in ASTM F316.

Any of zeolites with various crystal structures, such as LTA, MFI, MOR, FER, FAU, DDR, CHA, and BEA may be used to form the zeolite separation membrane 33. When made of DDR-type zeolite, the separation membrane 33 can be specifically used as a gas separation membrane for selectively separating carbon dioxide or as a dehydration membrane for selectively separating water.

(Repair Portion) The repair portion 34 is made of a repairing material of organic-inorganic hybrid silica to repair a defective portion 37 in which the surface of the ceramic porous body 9 is exposed without being covered with the zeolite separation membrane 33.

The organic-inorganic hybrid silica may be any of a material including organic and inorganic components chemically bonded together or a mixture of organic and inorganic components. The organic-inorganic hybrid silica to be used may be a product obtained by the hydrolysis and dehydration condensation of a silane coupling agent or an alkoxysilane. More specifically, the organic-inorganic hybrid silica to be used may be a product obtained by the hydrolysis and condensation of a bistriethoxysilyl compound of, for example, the structural formula: $(C_2H_5O)_3SiC_nH_{2n}Si(C_2H_5O)_3$ wherein $n≥1$. In this material, an organic component and a silicon-containing inorganic component are chemically bonded together.

(2) Production Method (2-1) Substrate

Next, a method for producing the separation membrane structure 1 using the monolith type substrate 30 will be described. First, a raw material for the porous body 9 is subjected to a forming process. For example, the raw material is subjected to extrusion using a vacuum extruder. This process results in a monolith type unfired substrate 30 having cells 4. Alternatively, a press molding process, a casting process, or the like may be appropriately selected and used. The unfired substrate 30 is then fired, for example, at 900 to 1,450° C.

(2-2) Zeolite Separation Membrane

Figure 4:
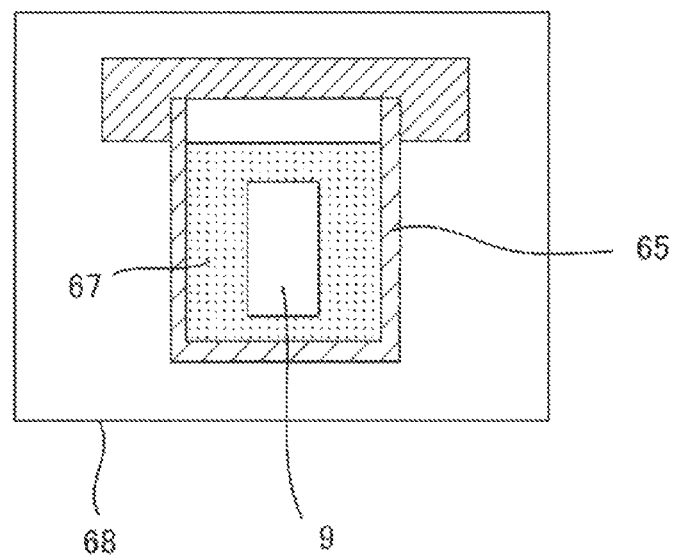
FIG. 4 is a schematic diagram showing an embodiment of a membrane forming step for forming a zeolite separation membrane on a porous body by hydrothermal synthesis.

The zeolite separation membrane 33 is then formed on the inner wall surface 4s of each cell 4. The zeolite separation membrane 33 used in the present invention can be synthesized by a conventionally known method. For example, as shown in FIG. 4, the zeolite separation membrane 33 is produced by a process that includes preparing a raw material solution (sol 67) of a silica source, an alumina source, a structure directing agent, an alkali source, water, and other materials; inserting the porous body 9 and the prepared raw material solution (sol 67) to a pressure-resistant vessel 65; and then subjecting the materials to a heat treatment (hydrothermal synthesis) at 100 to 200° C. for 1 to 240 hours in a dryer 68.

Figure 3:
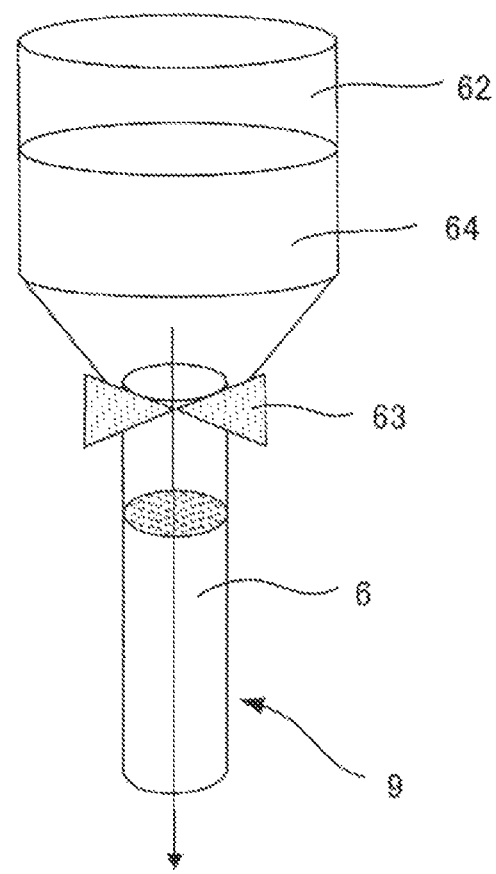
FIG. 3 is a schematic diagram showing a state in which seeding slurry is poured in the step of depositing particles or showing a state in which a repairing material is poured in the repairing step.

In this process, zeolite seed crystals 36 are preferably applied to the porous body 9 (substrate 30) in advance (see FIG. 2A). FIG. 3 shows an embodiment in which the seeding is performed by a flow-down method. The seed crystals 36 can be deposited by a process that includes fixing the porous body 9 to the lower end of a wide-mouth funnel 62, pouring seeding slurry 64 from above the porous body 9 by opening a cock 63, and allowing the slurry 64 to pass through the cells 4.

Subsequently, the porous body 9 on which the zeolite separation membrane 33 is formed is washed with water or hot water at 80 to 100° C., then taken out, and dried at 80 to 100° C. The porous body 9 is then placed in an electric furnace and heated at 400 to 800° C. for 1 to 200 hours in the air atmosphere so that the structure directing agent in the pores of the zeolite separation membrane 33 is removed by combustion. The zeolite separation membrane 33 can be formed in this way.

Examples of the silica source include colloidal silica, tetraethoxysilane, water glass, silicon alkoxide, fumed silica, precipitated silica, and the like.

The structure directing agent is used to form the pore structure of zeolite. Examples of the structure directing agent include, but are not limited to, tetraethylammonium hydroxide, tetraethylammonium bromide, 1-adamantanamine, tetrapropylammonium hydroxide, tetrapropylammonium bromide, tetramethylammonium hydroxide, and other organic compounds.

Examples of the alkali source include alkali metal sources such as sodium hydroxide, lithium hydroxide, and potassium hydroxide, alkaline earth metal sources such as magnesium hydroxide and calcium hydroxides, quaternary ammonium hydroxides, and the like.

The method for producing the zeolite separation membrane 33 may be applied to any of zeolites with various crystal structures such as LTA, MFI, MOR, FER, FAU, DDR, CHA, and BEA.

(2-3) Repair Portion

Next, a method for forming the repair portion 34 to repair the zeolite separation membrane 33 will be described. As shown in FIG. 2B, when the separation membrane 33 is formed by hydrothermal synthesis, a seed crystal 36 fails to be deposited or drops off after the deposition, so that an uncovered defect occurs.

As shown in FIG. 2C, the repair portion 34 is formed by a method for repairing the ceramic separation membrane structure of the present invention. A description will be given of a repairing step that includes forming the repair portion to repair the defective portion 37 on the ceramic porous body.

First, organic-inorganic hybrid silica, which is obtained by subjecting a silane coupling agent or an alkoxysilane to hydrolysis and dehydration condensation or the like, is dispersed in a solvent such as an alcohol to form a sol (repairing material). The sol as a repairing material is deposited on the defective portion 37 by a flow-down method in which the sol is allowed to flow down (by its own mass) along the surface of the zeolite separation membrane 33. Specifically, the sol is poured into the cylindrical holes (cells 4) of the porous body 9 so that a large amount of the liquid is allowed to flow parallel to the surface of the zeolite separation membrane. When allowed to pass through the cells 4 in this way, the sol flows on the surface of the zeolite separation membrane 33.

After the repairing material is deposited on the defective portion 37, a heat treatment is preferably performed at a temperature lower than the temperature at which the template for the zeolite separation membrane 33 is fired. Specifically, after natural drying, heating in a reducing atmosphere at 350° C. or lower, more preferably at 300 to 350° C. is performed.

In the method for producing the ceramic separation membrane structure of the present invention, the sol obtained by dispersing organic-inorganic hybrid silica in a solvent such as ethanol is simply applied to the membrane by a flow-down method, naturally dried, and heated at 350° C. or lower in a reducing atmosphere. Therefore, the method can be performed by a simple procedure with a simple apparatus. When repaired with the organic-inorganic hybrid silica, the membrane does not decrease in water permeability because the defective portion is selectively repaired. In addition, the organic-inorganic hybrid silica has high chemical resistance and can be treated at a temperature lower than the general zeolite template-firing temperature (the structure directing agent-firing temperature) in the repairing step, which does not degrade the performance of the zeolite separation membrane and is easy to perform.

(3) Separation Method

Figure 5A:
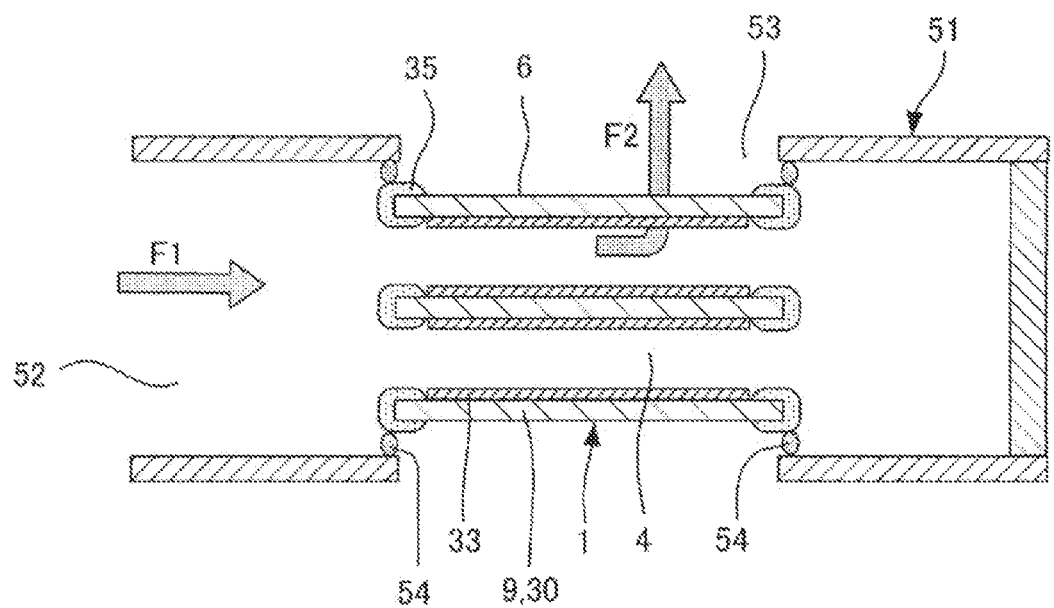
FIG. 5A is a schematic diagram showing an embodiment in which a monolith type separation membrane structure is installed in a housing and showing a cross-section parallel to the direction in which the cells of a ceramic separation membrane structure extend.

Next, a description will be given of a method for separating a component from a fluid as a mixture of two or more components using the separation membrane structure 1 of this embodiment. As shown in FIG. 5A, when the separation membrane structure 1 of this embodiment is used to separate fluids, the separation membrane structure 1 is preferably placed in a tubular housing 51 having a fluid inlet 52 and a fluid outlet 53, in which fluid to be treated F1 is allowed to flow into the housing 51 through the fluid inlet 52 and separated by the separation membrane structure 1, and the separated fluid (treated fluid F2) is preferably discharged from the fluid outlet 53.

As shown in FIG. 5A, when the separation membrane structure 1 is placed in the housing 51, sealing members 54 and 54 are preferably provided to seal the gaps between the separation membrane structure 1 and the housing 51 at both ends of the separation membrane structure 1. The sealing members 54 are typically, but not limited to, O-rings or the like.

The fluid to be treated F1, which flow into the housing 51 through the fluid inlet 52, entirely flows into the cells 4 of the separation membrane structure 1. From the fluid to be treated F1 flowing in the cells 4, the treated fluid F2 is separated by being allowed to pass through the separation membrane 33. The treated fluid F2 then enters the substrate 30. Subsequently, the treated fluid F2 flows out of the substrate 30 through the circumference surface 6 of the substrate 30 and exits from the fluid outlet 53 to the outside (outer space). The sealing members 54 and 54 prevent the fluid to be treated F1 and the treated fluid F2 from being mixed with each other.

Figure 5B:
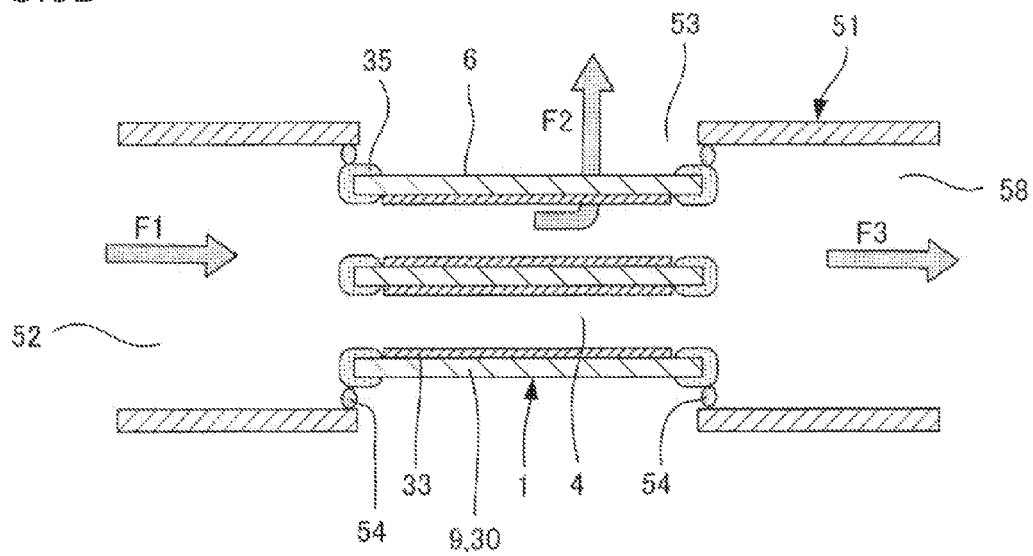
FIG. 5B is a schematic diagram showing another embodiment in which a monolith type separation membrane structure is installed in a housing and showing a cross-section parallel to the direction in which the cells of a ceramic separation membrane structure extend.

FIG. 5B shows another embodiment in which the separation membrane structure 1 is installed in a housing 51. As shown in FIG. 5B, the separation membrane structure 1 is placed in a tubular housing 51 having a fluid inlet 52 and fluid outlets 53 and 58. In this embodiment, fluid to be treated F1 are allowed to flow into the housing 51 through its fluid inlet 52 and then separated by the separation membrane structure 1, the separated fluid (treated fluid F2)

is discharged from the fluid outlet 53, and the reminder (fluid F3) is discharged from the fluid outlet 58. The discharge of the fluid F3 from the fluid outlet 58 makes it possible to increase the flow rate of the fluid to be treated F1 during the operation and to increase the flow rate of the permeating treated fluid F2.

EXAMPLES

Hereinafter, the present invention will be more specifically described with reference to examples, which, however, are not intended to limit the present invention.

(1) Preparation of Substrate (Porous Body)

A monolith type substrate 30 was prepared, and a separation membrane 33 was formed in the cells 4 of the substrate 30. First, the preparation of the substrate 30 will described.

(Substrate)

A kneaded material was prepared by adding water, a dispersing agent, and a thickener to alumina particles (aggregate particles) having an average particle size of 50 μm, and by mixing and kneading them. The resulting kneaded material was extruded to form a honeycomb-shaped unfired substrate 30.

The substrate 30 was then fired at 900 to 1,500° C. The substrate 30 (porous body 9) had a round pillar outer shape, an outer diameter of 30 mm, a cell diameter of 2.2 mm, 61 cells, and a length of 160 mm.

(2) Formation of DDR Membrane

A DDR membrane was formed as a separation membrane 33 on the inner wall surface 4s of each cell 4 of the porous body 9.

(2-1) Preparation of Seed Crystals

DDR-type zeolite crystal powder was produced based on the DDR-type zeolite producing method described in M. J. den Exter, J. C. Jansen, H. van Bekkum, Studies in Surface Science and Catalysis vol. 84, Ed. by J. Weitkamp et al., Elsevier (1994) 1159-1166 or JP-A-2004-083375. The DDR-type zeolite crystal powder was directly used as seed crystals 36, or if necessary, the DDR-type zeolite crystal powder was ground and then used as seed crystals 36. A seed crystal dispersion was prepared by dispersing the seed crystals 36 in water after the synthesis or the grinding and then removing coarse particles.

(2-2) Seeding (Particle Deposition Step)

The seed crystal dispersion prepared in the step (2-1) was diluted with ethanol so that the DDR concentration reached 0.3% by mass (the concentration of the solid in the slurry 64). The dilution was stirred with a stirrer at 300 rpm to give a seeding slurry (slurry 64). The porous body 9 was fixed to the lower end of a wide-mouth funnel 62, 160 ml of the seeding slurry was poured from above the porous body 9 and allowed to pass through the cells (see FIG. 3). The interior of the cells of the porous body 9, in which the slurry 64 was allowed to flow down, was subjected to through air drying under the conditions of room temperature and an air velocity of 3 to 6 m/s for 10 minutes. A sample was obtained after allowing the slurry 64 to flow down and through air drying, which were repeated twice. After the drying, the sample was subjected to microstructure observation with an electron microscope. It was confirmed that the DDR particles were deposited on the surface of the porous body 9.

(2-3) Membrane Production (Membrane Forming Step)

After 7.35 g of ethylenediamine (manufactured by Wako Pure Chemical Industries, Ltd.) was added to a 100 ml wide-mouth fluororesin bottle, 1.156 g of 1-adamantanamine (manufactured by Sigma-Aldrich) was added to the bottle and so dissolved that no 1-adamantanamine precipitate remained. To another vessel were added 98.0 g of 30% by mass colloidal silica (trade name: SNOWTEX S, manufactured by Nissan Chemical Industries, Ltd.) and 116.55 g of ion exchanged water, and gently stirred. Subsequently, the mixture was added to the wide-mouth bottle containing the mixture of ethylenediamine and 1-adamantanamine. The materials were then mixed by being shaken strongly to form a raw material solution. The molar ratio between the components in the raw material solution was as follows: 1-adamantanamine/$SiO_2$=0.016, water/$SiO_2$=21. The raw material solution in the wide-mouth bottle was then stirred for 1 hour with a homogenizer on which the bottle was set. The porous body 9 with the DDR particles deposited in the step (2-2) was placed in a pressure-resistant stainless steel vessel 65 equipped with a fluororesin inner cylinder with an inner volume of 300 ml. The prepared raw material solution (sol 67) was added to the vessel 65 and then subjected to a heat treatment (hydrothermal synthesis) at 138° C. for 15 hours (see FIG. 4). During the hydrothermal synthesis, the solution was alkaline because of colloidal silica and ethylenediamine as raw materials.

(2-4) Removal of Structure Directing Agent

The membrane formed in the membrane forming step was heated in the air atmosphere at 450° C. for 50 hours using an electric furnace, so that 1-adamantanamine in the pores was removed by combustion. As a result of X-ray diffraction analysis, the crystal phase was identified, and the presence of DDR-type zeolite was confirmed. After the membrane production, it was also confirmed that the porous body 9 was covered with DDR-type zeolite.

(3) Repair of Zeolite Separation Membrane

The zeolite separation membrane formed as described above was repaired using organic-inorganic hybrid silica. Hereinafter, the repair will be described more specifically.

(3-1) Preparation of Repairing Material

While the temperature was kept at 3° C., 17.01 g of BTESM (a bistriethoxysilyl compound of the structural formula: $(C_2H_5O)_3SiC_nH_{2n}Si(C_2H_5O)_3$ (n≥1) manufactured by Gelest, Inc.) and 44.28 g of ethanol were mixed and stirred (A). To 4.54 g of water was added 0.84 g of nitric acid (B). The mixture (B) was added dropwise to the mixture (A), and the resulting mixture was stirred at 60° C. for 5 hours (C). A repairing material was obtained by adding ethanol to the mixture (C) in such a manner that a solid content of 0.1% by mass was reached (D).

(3-2) Repairing Method

Using a flow-down method, 160 cc of the repairing material (D) was applied to the surface of the DDR membrane in the monolith type ceramic separation membrane structure 1 (unrepaired) with a diameter of 30 mm and a length of 160 mm. The inside of the cells was then blown off with a blower. The structure was then naturally dried in the air atmosphere for 1 hour. The dried structure was fired at 350° C. for 2 hours in an $N_2$ atmosphere to give a ceramic separation membrane structure 1 containing repair portion 34.

(4) Performance Evaluation

Figure 6:
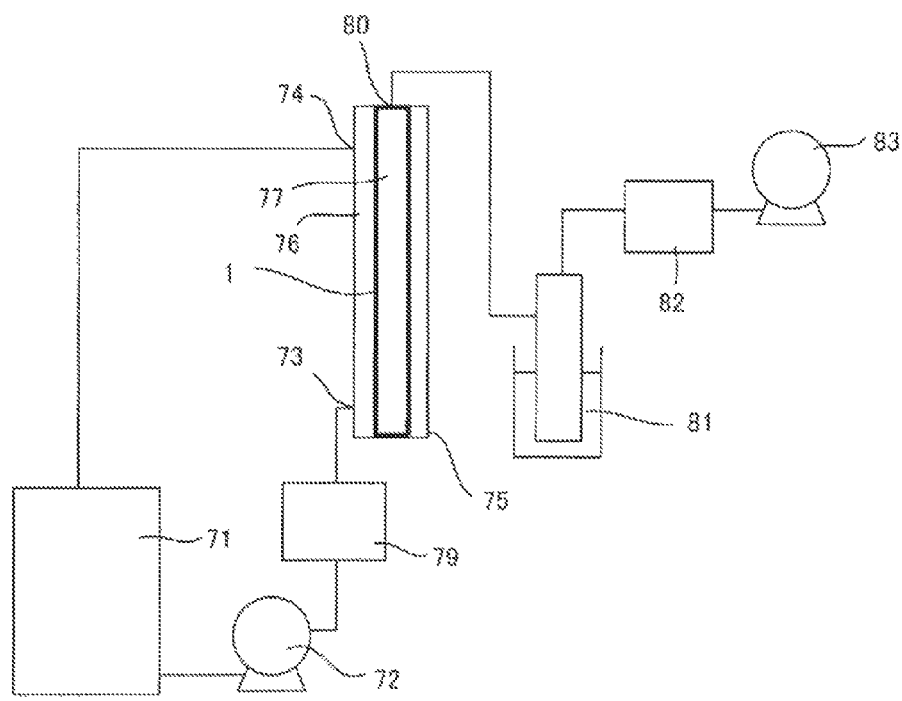
FIG. 6 is a schematic diagram showing the whole of a testing set used to perform a pervaporation test.

The prepared membrane was evaluated for performance of dehydration of acetic acid by a pervaporation method (PV method). FIG. 6 is a schematic diagram showing the whole of a testing set used to perform the pervaporation test. A module 75 made of SUS has a structure in which the separation membrane structure 1 having the zeolite separation membrane 33 is installed in a cylindrical outer vessel made of SUS. In the SUS module 75, the interior space is partitioned by the zeolite separation membrane 33 into a raw material-side space 76 and a permeation-side space 77. A feed solution inlet 73 and a feed solution outlet 74 are formed to communicate with the raw material-side space 76. A permeating vapor collection port 80 for discharging permeating vapor to the outside is formed at the upper end of the permeation-side space 77.

A raw material (feed solution) containing 90% by mass of acetic acid was placed in a raw material tank 71 and heated at 90° C. Using a feed pump 72, the raw material was circulated by feeding the raw material to the raw material-side space 76 of the SUS (stainless steel) module 75 through the feed solution inlet 73 and returning the raw material discharged from the feed solution outlet 74 to the raw material tank 71. A flowmeter 79 was used to monitor the flow rate of the raw material.

Using a vacuum pump 83, the pressure at the support side (permeation-side space 77) of the zeolite separation membrane 33 was reduced to 100 torr so that permeating vapor was allowed to pass through the zeolite separation membrane 33 and discharged from the permeating vapor collection port 80 was collected into a liquid $N_2$ trap 81. The degree of vacuum in the permeation-side space 77 was controlled by a pressure regulator 82.

The mass of the resulting liquid was determined with an electronic balance, and the composition of the liquid was analyzed by neutralization titration.

In the pervaporation test, the amount of the permeate and the acetic acid concentration were measured and the water flux and the acetic acid flux were calculated.

TABLE 1

|  | Acetic Acid Flux $kg/m^2h$ | Water Flux $kg/m^2h$ |
|---|---|---|
| Before Repair | 0.0050 | 1.3 |
| After Repair | 0.0027 | 1.3 |

(Results)

As shown in Table 1, the repair reduced only the acetic acid flux without reducing the water flux. In other words, the repair reduced the amount of leakage of acetic acid through defects to increase the separation factor, without changing the amount of permeation of water.

The BTESM used in the examples is a material including two components, an organic component and a silicon-containing inorganic component, chemically bonded together. Other types of organic-inorganic hybrid silica including two components, an organic component and a silicon-containing inorganic component, chemically bonded together can also be expected to produce a similar effect.

INDUSTRIAL APPLICABILITY

The method for producing the ceramic separation membrane structure of the present invention can be used to repair a ceramic separation membrane structure having a zeolite separation membrane formed on the inner wall surface of cells. The ceramic separation membrane of the present invention can be used to separation of a gas mixture or a liquid mixture.

DESCRIPTION OF REFERENCE NUMERALS

1: separation membrane structure, 1s: seal portion, 2, 2a, 2b: end face, 3: partition wall, 4: cell, 4s: inner wall surface, 6: circumference surface, 9: porous body, 30: substrate, 33: separation membrane, 34: zeolite repair portion, 36: seed crystal, 37: defective portion, 51: housing, 52: fluid inlet, 53, 58: fluid outlet, 54: sealing member, 62: wide-mouth funnel, 63: cock, 64: slurry, 65: pressure-resistant vessel, 67: sol, 68: dryer, 71: raw material tank, 72: feed pump, 73: feed solution inlet, 74: feed solution outlet, 75: SUS module, 76: raw material-side space, 77: permeation-side space, 79: flowmeter, 80: permeating vapor collection port, 81: liquid $N_2$ trap, 82: pressure regulator, 83: vacuum pump.

The invention claimed is:

1. A method for producing a ceramic separation membrane structure comprising:
   forming a ceramic porous body;
   forming a zeolite separation membrane on the ceramic porous body; and
   repairing a repair portion of the zeolite separation membrane by depositing a repairing material of a chemically bonded organic-inorganic hybrid silica, which is dispersed in a solvent to form a sol, by a flow-down method comprising allowing the repairing material to flow down by its own mass parallel to a surface of the zeolite separation membrane.

2. The method for producing a ceramic separation membrane structure according to claim 1, wherein the repairing step comprises performing a heat treatment at a temperature lower than a template firing temperature of zeolite separation membrane after the repairing material is deposited.

3. The method for producing a ceramic separation membrane structure according to claim 2, wherein the heat treatment is performed at a temperature of 350° C. or lower.

4. The method for producing a ceramic separation membrane structure according to claim 1, wherein the organic-inorganic hybrid silica is a product obtained by hydrolysis and dehydration condensation of a silane coupling agent or an alkoxysilane.

5. The method for producing a ceramic separation membrane structure according to claim 1, wherein the organic-inorganic hybrid silica is a product obtained by hydrolysis and condensation of a bistriethoxysilyl compound of the structural formula: $(C_2H_5O)_3SiC_nH_{2n}Si(C_2H_5O)_3$, wherein $n \geq 1$.

6. The method for producing a ceramic separation membrane structure according to claim 1, wherein the zeolite separation membrane comprises DDR-type zeolite.

7. The method for producing a ceramic separation membrane structure according to claim 1, wherein the ceramic porous body has a monolith shape.

* * * * *